Dec. 3, 1968 L. E. ROOT 3,414,342
SELF-LUBRICATING THRUST BEARING
Filed Feb. 6, 1967
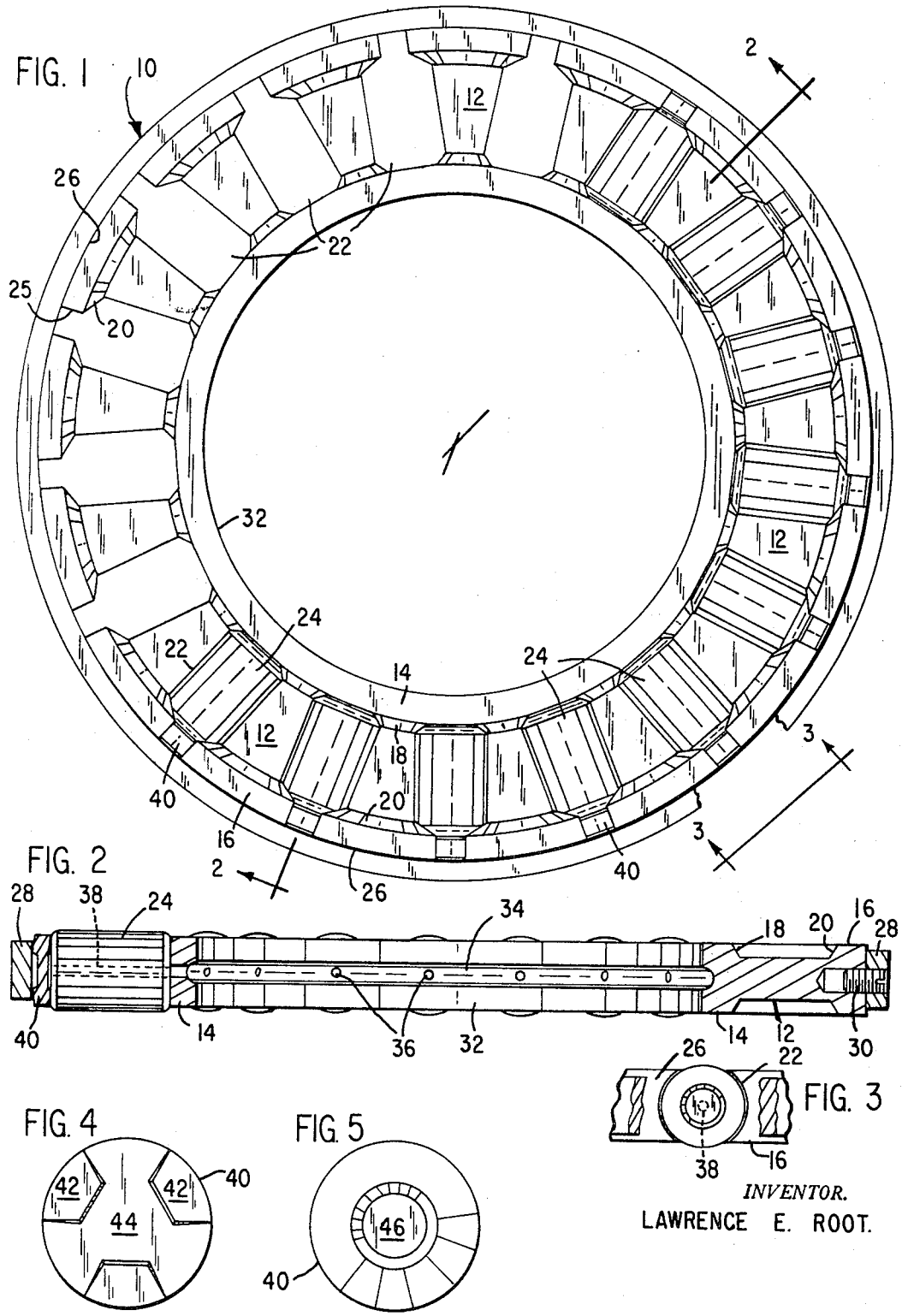
INVENTOR.
LAWRENCE E. ROOT.

United States Patent Office 3,414,342
Patented Dec. 3, 1968

3,414,342
SELF-LUBRICATING THRUST BEARING
Lawrence E. Root, Syracuse, N.Y., assignor to Rollway Bearing Company, Inc., Syracuse, N.Y., a corporation of New York
Filed Feb. 6, 1967, Ser. No. 614,068
1 Claim. (Cl. 308—235)

ABSTRACT OF THE DISCLOSURE

An improved lubricated thrust bearing roller cage assembly having a thrust disc abutting the outer end of a roller mounted in each roller receiving slot in the cage assembly. Lubricant is fed under pressure thru the inner side of the cage assembly thru each of the rollers to each of the thrust pads.

---

This invention relates to and has as an object a new and improved self-lubricating thrust bearing.

As is well understood in the art, thrust bearings which are subjected to continuous loading have their life span considerably increased when they are provided with lubrication. A problem arises, however, in that it is difficult to continuously and completely lubricate such thrust bearings while they are loaded and the bearing members are being rotated.

It has been known heretofore in the prior art to provide thrust bearings with means to lubricate the anti-friction members, such means typically comprise boring the roller cage, in the case of thrust bearings of the roller type, and providing a system to feed lubricant through the bored cage to the rollers. It is further old in the art to bore the rollers themselves to provide the outer end of the roller with lubricant, which is fed through the bored cage and through a bore in the roller.

In such arrangement it has been found advantageous to provide between the outer end of the roller and the retaining ring, which is affixed to the cage, a thrust disc. Such a disc prevents the roller, which is forced outwardly by centrifugal force when the thrust bearing is placed under a heavy load and rotated at high speeds from acting in the manner of a drill and cutting into the bearing cage and retaining ring.

A problem has arisen, however, in attempting to properly and adequately lubricate such a thrust disc in a self-lubricating thrust bearing of the type hereinbefore mentioned.

Consequently, it is an object of this invention to provide a new and improved self-lubricating thrust bearing wherein the anti-friction members have a thrust disc associated therewith and wherein said discs are formed in a new and novel manner to facilitate lubrication.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIGURE 1 is a top plan view of the bearing cage shown with some of the roller members mounted in the bearing cage.

FIGURE 2 is a cross-sectional view taken on line 2—2 of FIGURE 1.

FIGURE 3 is a fragmentary elevational view looking in the direction of the arrows on line 3—3 of FIGURE 1.

FIGURE 4 is a plan view of the thrust discs forming a novel portion of the invention showing the inner surface of the disc.

FIGURE 5 is a plan view of the thrust discs shown in FIGURE 4 wherein the outer surface of the disc is illustrated.

As will be understood, the complete thrust bearing is made up of a top and bottom race affixed together in any suitable manner and having a roller cage assembly therebetween. For the purpose of simplifying the description of the invention, only the roller cage assembly and parts thereof are shown in the drawings.

In FIGURE 1 the roller cage indicated at 10 is made up of any suitable material and is formed with a center rib or web section 12 (see also FIGURE 2), which connects an inner annular portion 14 to an outer annular portion 16. As best seen in FIGURE 2, the rib section is in the form of an annulus and is of a uniform cross-sectional thickness and is connected to the inner and outer portions 14 and 16 by means of sloped walls 18 and 20, respectively. The rib or web section 12 is provided with a plurality of cut-outs 22 to receive the roller members 24. As most clearly seen in FIGURE 3, the outer end 25 of the slots 22 intersect the outer annular portion 16 as well as the sloping wall 20 and breaks through the outer face 26 of the roller cage.

Accordingly, the roller 24, as best seen in the lefthand portion of the cross-sectional view shown in FIGURE 2 is received in the roller cage in the slots 22 between the inner annular portion 14, which has a cross-sectional thickness smaller than the roller diameter 24 and the outer face wall 26 of the roller cage. The rollers are inserted in the cage through the aperture formed by the slot 22 in the end wall face 26 of the cage as best seen in FIGURE 3.

An annular retaining ring 28 is attached to and affixed to the roller cage, after a full complement of rollers 24 have been inserted in the slots 22, by any suitable means such as a set-screw 30 as best shown in the righthand portion of FIGURE 2. As will be understood, the ring 28 and the cage member may be provided with any desired number of drilled and tapped apertures for any desired number of screws 30.

The inner wall 32 of the cage member is provided with an annular groove 34 into which lubricant is fed under pressure in any of the manners well-known within the bearing art.

The groove or channel 34 is intersected by radial apertures 36 which connect the groove 34 to the roller slots 22, there being an aperture 36 associated with each roller slot 22. Further, the cylindrical rollers 24 are formed with square end surfaces and are bored on their diameter as at 38, so that lubricant introduced into the apertures 36 from the channel 34 may pass through the rollers 24 by means of the bores 38.

Received in the aperture 25 between the outer end face of the rollers 24 and the retaining ring 28 are thrust discs 40 which are formed in a new and novel manner so as to provide for lubrication between the outer end face of the rollers 24 and the retaining ring 28. The thrust discs 40 are best seen in FIGURES 4 and 5 and have an inner surface which is coined so as to provide for a plurality, shown to be three in number, of raised pads 42. The pads 42 extend above the plane of the coined surface 44 for a purpose to be hereinafter described. The opposite or outer surface is spherical and the radius of this surface is less than the radius of the internal surface of ring 28 in order to provide a bearing effect between these surfaces. The diameter of the thrust discs 40 is slightly less than the diameter of the roller 24, so as not to receive any of the load on the bearing rollers and, accordingly, rotate at a relatively less amount than the rotation of the rollers 24 when the roller cage assembly in subjected to a load. As seen in FIGURE 5, the outerside of the disc 40 is also relieved at 46 to minimize the amount of surface area contact with the internal surface of ring 28.

In operation the lubricant passes through the channel 34 and apertures 36 and 38 in the roller cage and the rollers respectively to provide lubrication for the frictional engagement between the outer end face of the roller 24 and the inner surface of the thrust disc 40. As the roller cage assembly rotates, the lubricant envelops the disc and forms a hydro-dynamic film on the pads 42 formed on the inner surface of the thrust disc. Also due to centrifugal force and capillary action, the lubricant passes radially outwardly on the surface 44 and over the periphery 40 of the disc to coat and cover the reverse or outer surface of the thrust disc to similarly lubricate and reduce the frictional engagement between the inner face of the ring 28 and the outer face of the thrust disc.

It has been found in use that the aforementioned lubrication envelopment phenomenon greatly extends the useful life of the assembly and in particular in the case of high speed thrust bearings, and appears to be due to the novel manner in which the thrust disc 40 is formed. Since this disc rotates at a relatively slower speed there is no appreciable machining effect that takes place between the roller 24 or the ring 28.

What I claim is:

1. A self-lubricating thrust bearing roller cage assembly comprising a roller cage member formed with a plurality of roller receiving slots, said member being provided with a lubricating bore connecting rollers in said slots to a lubricant receiving channel in said cage member, said rollers being provided with an axial bore to connect the outer end surfaces of said rollers to said lubricant receiving channel between the outer end surfaces of said rollers and retaining means for retaining thrust discs and said rollers in said cage member, said thrust discs being provider on their inner faces with a plurality of raised pads and a lubricant receiving depressed portion, the outer face of said thrust discs contacting said rollers being arcuate with the center portion relieved to provide a minimum of surface area contact therebetween.

No references cited.

MARTIN P. SCHWADRON, *Primary Examiner.*

FRANK SUSKO, *Assistant Examiner.*